(12) United States Patent
Kise

(10) Patent No.: US 7,446,900 B2
(45) Date of Patent: Nov. 4, 2008

(54) GENERATING A TARGET CURVE AND GENERATING A CALIBRATION CURVE

(75) Inventor: Takashi Kise, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 10/465,305

(22) Filed: Jun. 20, 2003

(65) Prior Publication Data

US 2004/0008357 A1 Jan. 15, 2004

(30) Foreign Application Priority Data

Jul. 1, 2002 (JP) ............................. 2002-192110

(51) Int. Cl.
*H04N 1/60* (2006.01)
*H04N 1/46* (2006.01)

(52) U.S. Cl. .................. 358/1.9; 358/406; 358/504; 358/521

(58) Field of Classification Search ........... 358/1.9, 358/1.1, 1.6, 3.1, 1.11, 1.18, 2.1, 2.99, 3.01, 358/406, 504, 501, 516, 518, 519, 521, 522, 358/523, 524, 525, 528, 529, 530; 382/162, 382/167; 347/2, 3, 5, 14, 23, 24; 399/1, 399/8, 9, 14, 15, 24, 28, 38, 39
See application file for complete search history.

(56) References Cited

U.S. PATENT DOCUMENTS

| | | | | |
|---|---|---|---|---|
| 5,537,516 A * | 7/1996 | Sherman et al. | ............... | 358/1.9 |
| 6,072,513 A * | 6/2000 | Agano | ........................ | 347/188 |
| 6,262,810 B1 * | 7/2001 | Bloomer | ..................... | 358/1.9 |
| 2001/0024284 A1 | 9/2001 | Kise | ........................... | 358/1.1 |
| 2002/0044307 A1 | 4/2002 | Kise | ........................... | 358/504 |

\* cited by examiner

*Primary Examiner*—Dov Popovici
(74) *Attorney, Agent, or Firm*—Fitzpatrick, Cella, Harper & Scinto (57) ABSTRACT

A calibration target curve with less error is provided even when the number of points to be edited of the calibration target curve is small. An efficient and accurate method for editing or generating the calibration target curve is also provided. For this purpose, on the basis of specified input data values versus a plurality of predetermined output density values, there is generated a calibration target curve which shows the correspondence relation from the input data values to the output density values.

5 Claims, 7 Drawing Sheets

| INPUT DATA VALUE | OUTPUT DENSITY VALUE |
| --- | --- |
| 0.0 | 0.00 |
| 0.1 | 0.24 |
| 0.2 | 0.39 |
| 0.3 | 0.47 |
| 0.4 | 0.50 |
| 0.5 | 0.50 |
| 0.6 | 0.50 |
| 0.7 | 0.53 |
| 0.8 | 0.61 |
| 0.9 | 0.76 |
| 1.0 | 1.00 |

| INPUT DATA VALUE | OUTPUT DENSITY VALUE |
|---|---|
| 0.00 | 0.0 |
| 0.04 | 0.1 |
| 0.08 | 0.2 |
| 0.13 | 0.3 |
| 0.21 | 0.4 |
| 0.50 | 0.5 |
| 0.79 | 0.6 |
| 0.87 | 0.7 |
| 0.92 | 0.8 |
| 0.96 | 0.9 |
| 1.00 | 1.0 |

GENERATING A TARGET CURVE AND GENERATING A CALIBRATION CURVE

BACKGROUND OF THE INVENTION

1. Field of the Invention

The present invention relates to calibration techniques that stabilize variations of color in output image due to individual differences of printers or environmental changes, such as temperature-humidity variations. More particularly, the present invention relates to a calibration target curve generation method.

2. Description of the Related Art

Printer calibration stabilizes (compensates for) the tone reproducibility of a printer that varies in accordance with variations in an establishment environment (temperature, humidity, etc.) or aging of the printer. A calibration curve can be obtained by computing a function that compensates for differences between input/output data characteristics with ideal tone reproducibility (a calibration target curve) and the measured values of outputs (a chart including a plurality of color patches) of the actual printer.

The calibration target curve used for calibration of the printer and the like is predetermined or created by an operator.

To be specific, when the target curve is edited, the desired output density values for corresponding input data representing the gradations of, for example, CMYK (Cyan Magenta Yellow Black) are specified to define the target curves.

Figure 3:
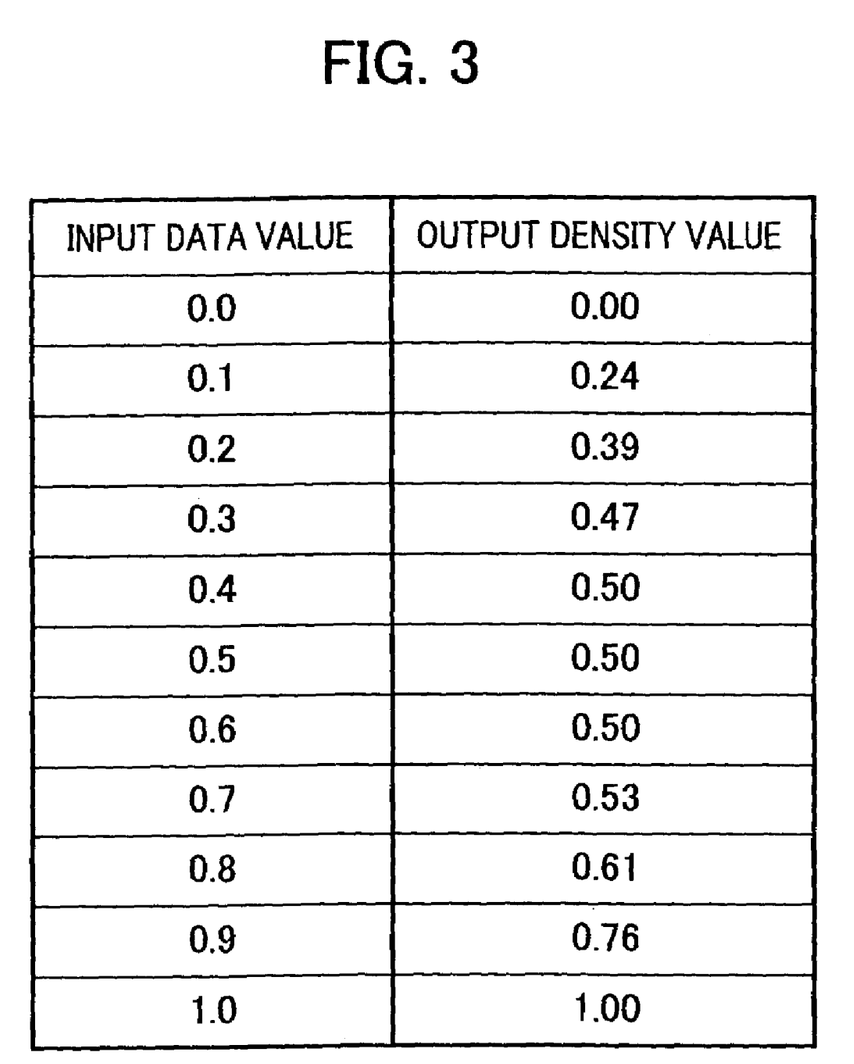
FIG. 3 is a known calibration target curve data edit screen.

FIG. 3 shows an example edit screen for generating target curve data during a known calibration. In practice, the domain of input data values x and the range of output density values y are determined for each of CMYK where the input data values (when the data is represented with 8 bits) range from 0 to 255 and the output density values y range from 0 to the maximum density value. For simplicity, the description will be made with each of the values ranging from 0 to 1.

Figure 4:
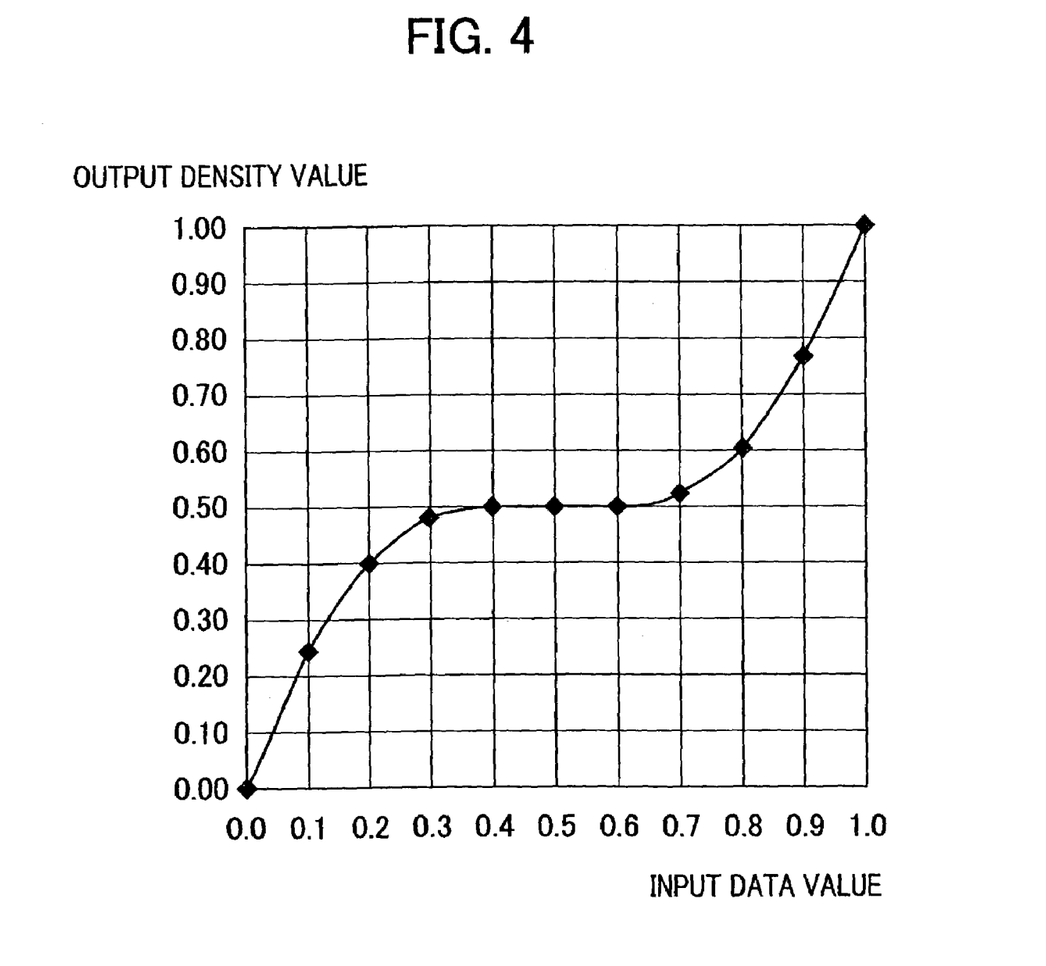
FIG. 4 is a graph showing an example calibration target curve via the point data specification shown in FIG. 3.

The target curve is obtained as follows: the output density values versus the input data at equal intervals as shown in FIG. 3 are specified; segments between points indicating input-output relationships are interpolated. FIG. 4 shows the target curve specified in FIG. 3.

In the above method of specifying the output density values versus the input data values, when gradient variations in the target curve are steep between the points representing the input-output relationships (for example, between 0.0 and 0.1, between 0.1 and 0.2, between 0.8 and 0.9, between 0.9 and 1.0), errors due to curve interpolation in the corresponding segments increase. In particular, when the load on the operator is intended to be alleviated by decreasing the number of specifying points indicating the input data values (for example, the input data values are specified with an interval of 0.2), more errors occur due to the curve interpolation.

SUMMARY OF THE INVENTION

Accordingly, it is an object of the present invention to generate a calibration target curve with less error even when the number of points to be edited on the calibration target curve is few.

In addition, when the calibration target curve is edited or generated, it is another object of the present invention to provide efficient and accurate edit and generation methods.

To this end, there is provided a method for generating a calibration target. This method includes the steps of: displaying a screen for generating a calibration target curve; specifying input data values versus a plurality of predetermined output density values; and generating the calibration target curve on the basis of the relationship between the input data values and the predetermined output density values.

Further objects, features and advantages of the present invention will become apparent from the following description of the preferred embodiments with reference to the attached drawings.

DESCRIPTION OF THE PREFERRED EMBODIMENTS

Figure 1:
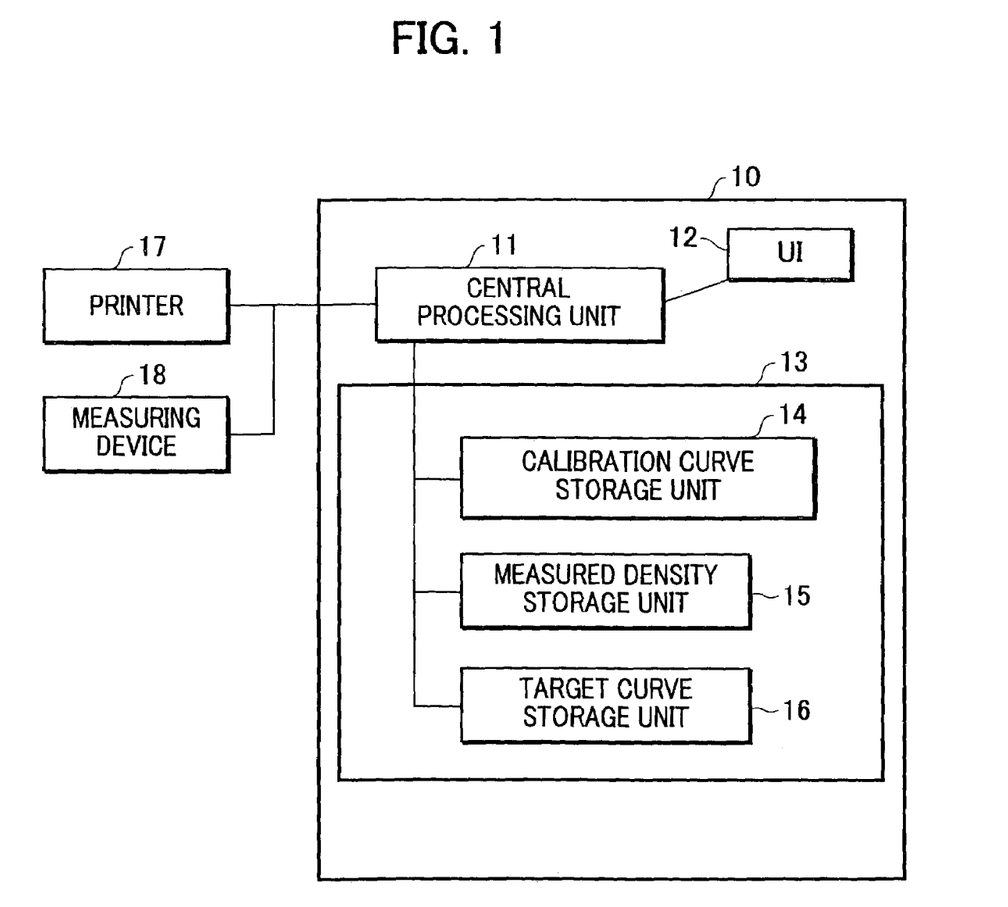
FIG. 1 is a block diagram of a structure of an embodiment of the present invention.

FIG. 1 shows the construction of a first embodiment. A computer 10 is connected to a printer 17 and a measuring device 18. The printer 17 can perform printing using one of the following printing mechanisms: inkjet, electrophotography, and thermal transfer. The measuring device 18 is one of a densitometer, a calorimeter, and a scanner. The computer 10 includes a central processing unit 11, a user interface 12 including an operation unit (mouse, keyboard) and a display unit (monitor, display), and a storage unit 13. The storage unit 13 includes a calibration curve storage unit 14, a measured density storage unit 15, and a target curve storage unit 16. The storage unit 13 also includes a ROM (Read Only Memory) or a hard disk and a RAM (Random Access Memory). The ROM or hard disk stores a program in which the steps in the flowchart in FIG. 2 are executed; the RAM (Random Access Memory) serves as a working space for the program.

Figure 2:
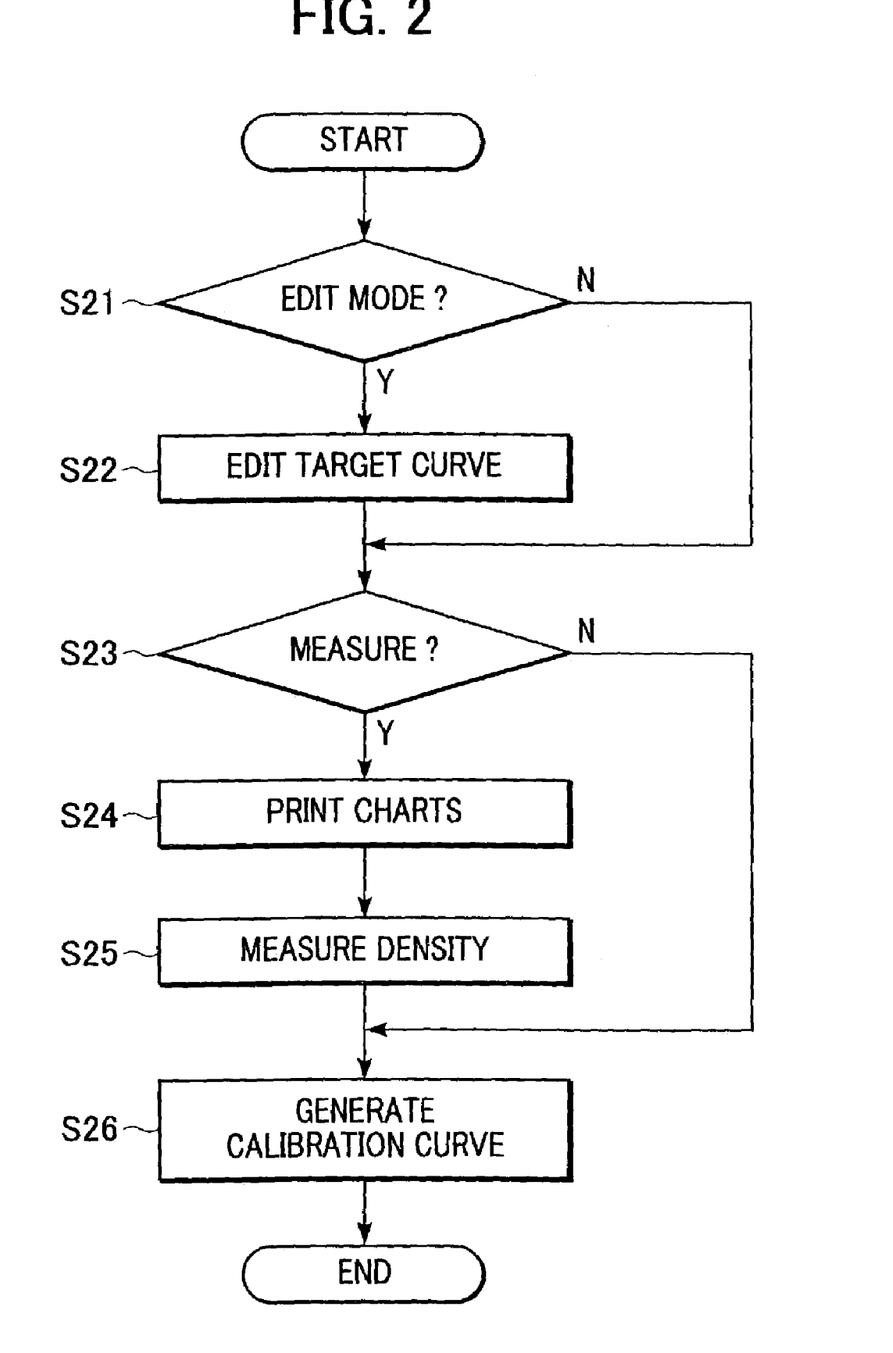
FIG. 2 is a flowchart showing calibration of that embodiment.

FIG. 2 shows the flowchart of the calibration according to the present embodiment. This flowchart is realized by causing the central processing unit 11 to execute the above program, which may be a utility program or an application program.

At step S21, the process determines whether an operator uses the operation unit to request edit of the target curve via an operation menu of the calibration program shown on the display unit. When the determination is negative, the process proceeds to step S23; otherwise, the process proceeds to step S22.

At step S22, an edit operation screen for the calibration target curve is shown in response to the operator's request at step S21. The operator gives instructions from the user interface 12 to generate or edit the target curve. The generation method of the target curve will be described below. The result is stored in the target curve storage unit 16.

At step S23, the process determines whether the operator is using the operation unit to request density measurement via the operation menu. When the determination is negative (no measurement), the process proceeds to step S26; otherwise, the process proceeds to step S24.

At step S24, the process causes the printer 17 to print patches (calibration charts) ranging from a low density to the highest density of each of color materials (yellow, magenta, cyan, and black when four colors are used for calibration;

light cyan and light magenta are added when six colors are used; alternatively, special colors including orange and green may be added in addition to the four colors) that correspond to a printing material (ink or toner) of the printer 17. The operator uses the operation unit to select an item "Print chart" of the operation menu to perform printing.

At step S25, the process causes the measuring device 18 to measure the patch density of each of the charts printed at step S24, and the measured patch density is stored in the measured density storage unit 15.

Figure 5:
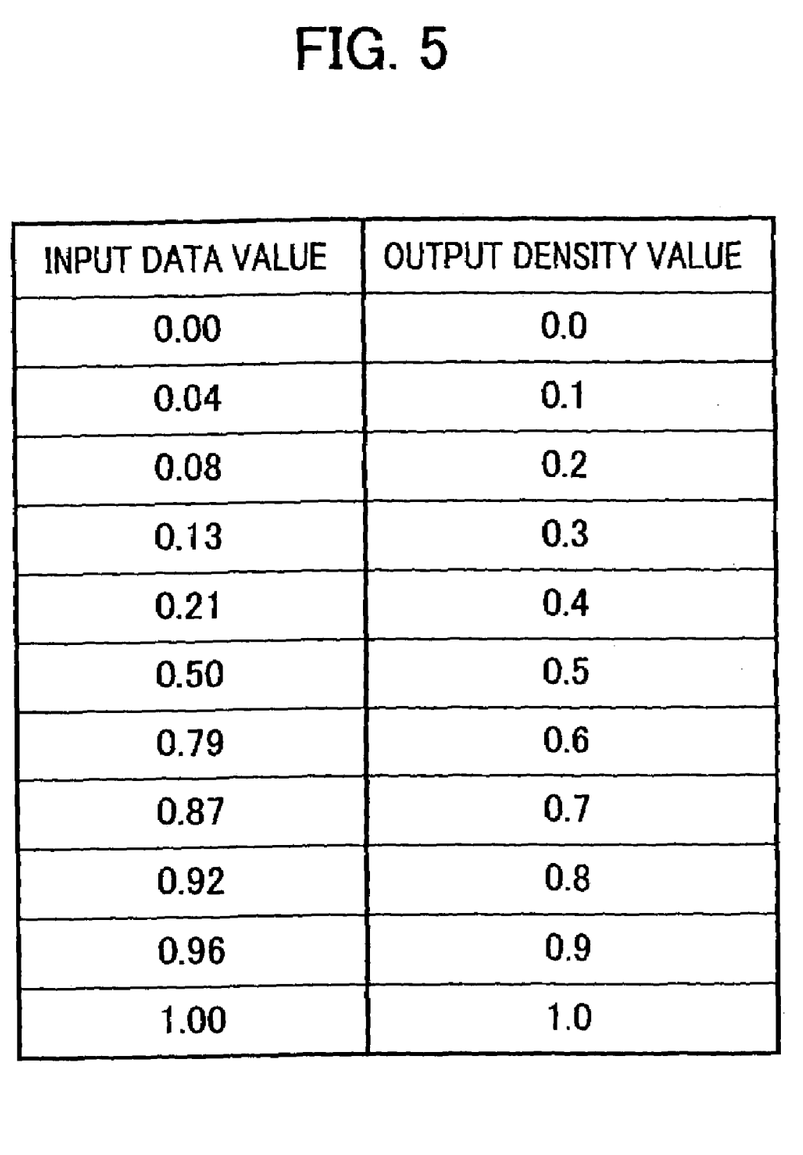
FIG. 5 is a calibration target curve data edit screen according to the embodiment of FIG. 1.
Figure 6:
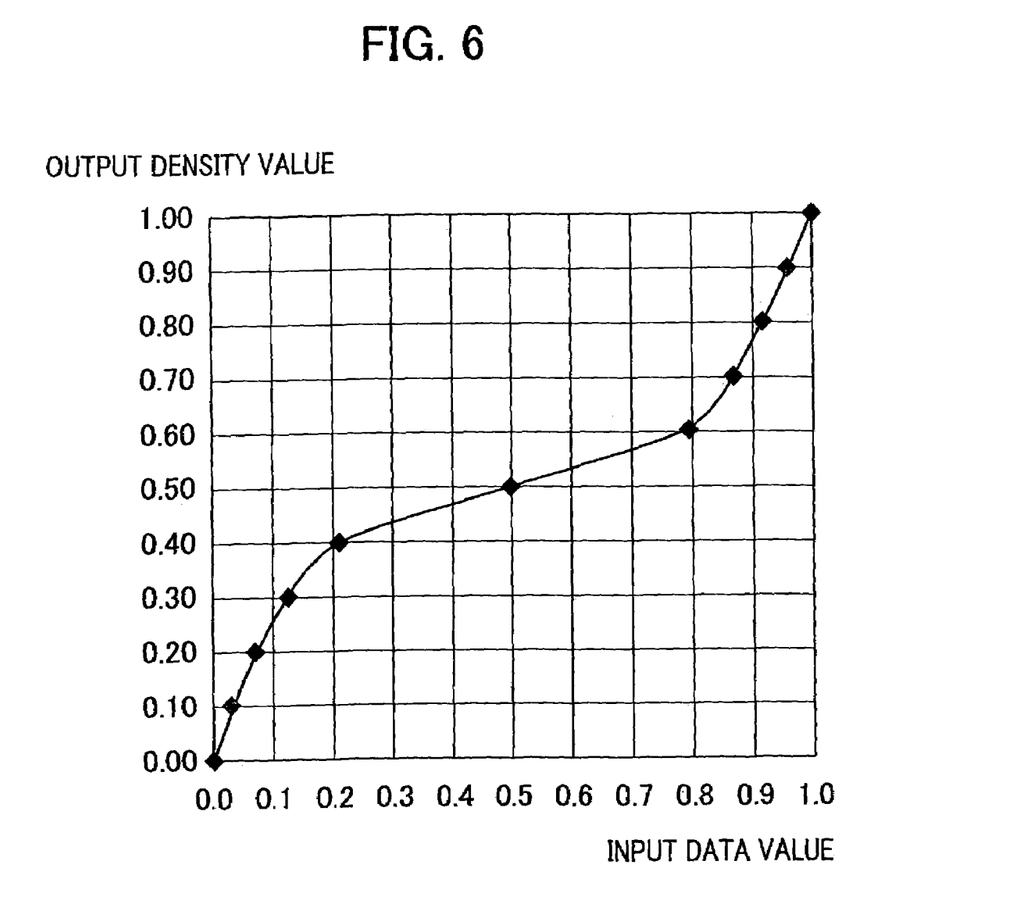
FIG. 6 is a graph showing an example target curve via the point data specification shown in FIG. 5.

At step S26, on the basis of the target curve stored in the target curve storage unit 16 and the measured densities of the charts stored in the measured density storage unit 15, the process generates the calibration curve, which is stored in the calibration curve storage unit 14. The method of generating the calibration curve is as follows: the inverse function of a measured density function is computed so that a function obtained by combining a calibration-curve function (input: pre-compensated CMYK data values, output: post-compensated CMYK data values) and the measured density function (input: CMYK data values, output: density values) corresponds to the target curve function (input: CMYK data values, output: density values). This computed inverse function is the calibration-curve function, which is applied to an image to be processed to realize the most accurate tone reproduction to the target curve. When, during the generation of the calibration curve, there is a plurality of target curves including the target curves that are already generated, the latest edited/generated target curve is automatically selected. Alternatively, instead of automatically selecting the latest target curve, a group of target curves stored in the target curve storage unit 16 is shown, so that the operator may select curves via the user interface 12. In this case, when the operator edits or generates the target curve, the operator feeds auxiliary information to the target curve storage unit 16 so that the fed information is associated with the edited/generated target curve. The auxiliary information includes information on the generation date of the target curve, the generation intention (highlight emphasis, gradation emphasis, etc) thereof, the name of the generator, and the name corresponding to the target curve. By showing the auxiliary information corresponding to each adjacent target curve on the operation unit, the user can easily select a desired target curve. FIG. 5 shows the edit screen according to the present embodiment for generating target curve data at step S22. Alternatively, after a graph with the axis of abscissa representing input data values and the axis of ordinates representing output data values is shown on the edit screen, the operator uses the user interface 12 to plot the graph in units of 0.1 from 0.1 to 1.0 with respect to the axis of ordinates (i.e., the operator specifies the input data value with respect to the axis of ordinates of 0.1, then specifies the input data value with respect to the axis of ordinates of 0.2, and so on). Unlike the edit screen in FIG. 3, when the output density values are at equal intervals, the operator uses the user interface 12 to specify the corresponding input data values via the operation menu. FIG. 6 shows an example target curve as specified in FIG. 5.

When the target curve shown in FIG. 6 according to the present embodiment is compared with the target curve shown in FIG. 4 according to the known art described above, it is observed that the target curve can be generated more accurately in a certain region, for example, below 0.2. In other words, since input data values versus the output density values at equal intervals are specified via the operation menu by the operator, more points are disposed in regions where variations in the output density values are large. This can decrease errors and increase accuracy.

By contrast, although the number of specified input data values is small in regions where variations in the output density values are small, errors occurring due to interpolation are insignificant.

Figure 7:
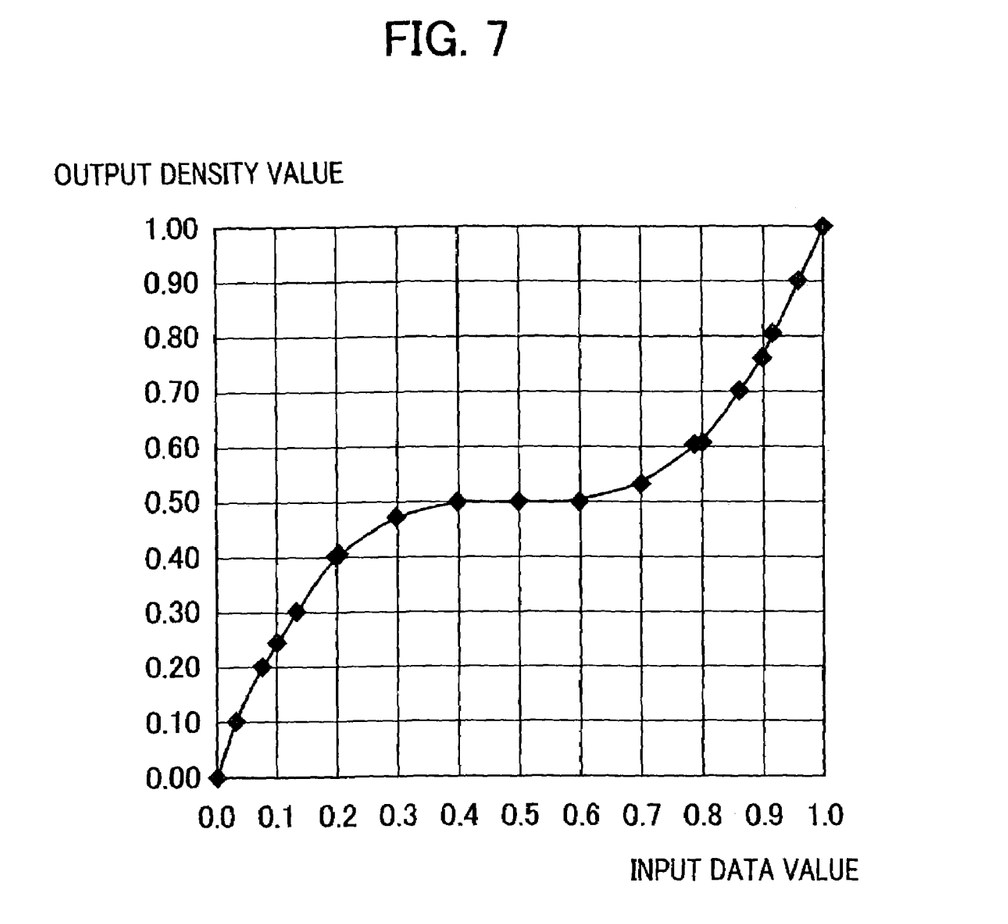
FIG. 7 is a graph showing an example target curve via the point data specification according to another embodiment.

Alternatively, the target curve may be generated using a combination of the specification of the input data values versus the output density values at equal intervals via the operation screen in the above embodiment and the specification of the output density values versus the input data values at equal intervals via the operation screen in the known manner. In this case, when data is specified, the edit screen in FIG. 5 or the above-described graph is used for plotting coordinates. For example, FIG. 7 shows an example in which the target curve is generated based on the points specified in the edit screens of FIGS. 3 and 5. This permits the generation of the target curve with fewer errors and more accuracy than the above embodiment.

In the above embodiment, the target curve is generated by specifying input data values versus the output density values at equal intervals over the entire region. Alternatively, the input data values versus the output density values at equal intervals are specified in regions where the variations in the gradient of the curve are steep; otherwise, the output density values versus the input data values at equal intervals are specified.

Although the CMYK are used as input data values in the above embodiment, the above target curve generation method can be applied to the K color data alone, CMY color data, or any kind of multiple color data.

One of the objects of the present invention is achieved by providing a storage medium (or recording medium) storing a software program code that realizes the features of the above embodiment to a system or an apparatus whose computer (or CPU (Central Processing Unit), MPU (Micro-Processing Unit)) reads the program code stored in the storage medium to execute the code. In this case, since it is the program code that realizes the above features of the embodiment, the storage medium storing the program code is also a component of the present invention. In order to realize the above features of the embodiment, the operating system (OS) that runs on the computer also serves to perform part of or the entirety of an actual task in accordance with instructions of the program code.

Alternatively, after the program code read from the storage medium is loaded in a memory of an expansion card or an expansion unit connected to the computer, a CPU or the like provided in the expansion card or the expansion unit executes part of or the entirety of the actual task in accordance with the instructions of the program code to realize the above features of the embodiment.

When the above embodiment is applied to the storage medium, the storage medium stores the program code corresponding to the flowchart described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for generating a target curve, comprising the steps of:
- displaying a screen for generating a target curve;
- accepting input from an operator specifying input data values versus a plurality of predetermined output density values such that more data points are available where variations in output density values are larger;
- generating the target curve representing input/output data characteristics with ideal tone reproducibility on the basis of the relationship between the input data values specified by the operator and the predetermined output density values; and
- generating a calibration curve on the basis of the generated target curve and measured density values of a calibration chart, including a low density patch and a high density patch, printed by a printer.

2. A method for generating a target curve according to claim 1, wherein the plurality of predetermined output density values are at equal intervals.

3. A method for generating a target curve according to claim 1, wherein the target curve is generated by interpolating adjacent input data values.

4. A method for generating a target curve according to claim 1, wherein the operator specifies the input data values by plotting a graph or inputting the input data values into a table.

5. A computer-readable medium encoded with a computer program containing instructions for:
- displaying a screen for generating a target curve;
- accepting input from an operator specifying input data values versus a plurality of predetermined output density values such that more data points are available where variations in output density values are larger;
- generating the target curve representing input/output data characteristics with ideal tone reproducibility on the basis of the relationship between the input data values specified by the operator and the predetermined output density values; and
- generating a calibration curve on the basis of the generated target curve and measured density values of a calibration chart, including a low density patch and a high density patch, printed by a printer.

* * * * *